Dec. 1, 1964        G. F. ASBURY, SR        3,159,807

SIGNAL ANALYSIS METHOD AND SYSTEM

Filed March 24, 1958        3 Sheets-Sheet 1

INVENTOR.
GEORGE F. ASBURY SR.
BY *Lulwider Mattingly Huntly*
Attorneys

INVENTOR.
GEORGE F. ASBURY SR.

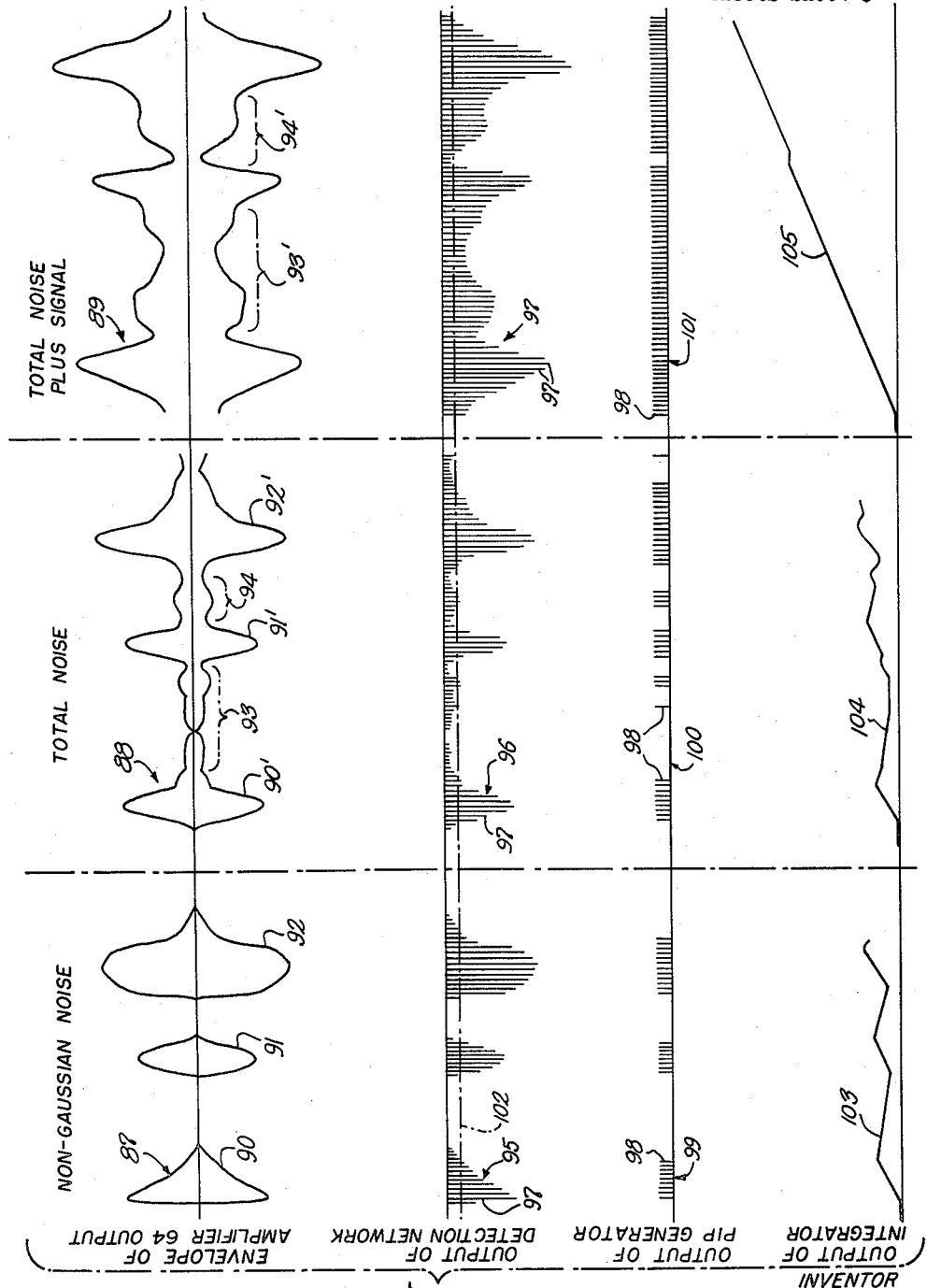

3,159,807
SIGNAL ANALYSIS METHOD AND SYSTEM
George F. Asbury, Sr., Santa Barbara, Calif., assignor to Atlantic Research Corporation, Fairfax, Va., a corporation of Virginia
Filed Mar. 24, 1958, Ser. No. 723,256
11 Claims. (Cl. 340—6)

This invention relates to signal detection systems, and more particularly to a unique method and apparatus for detecting and indicating the position of localized sound sources in the ocean.

Whatever the medium from which intelligence is to be extracted, it has always been considered that the noise of the medium, i.e., background noise, is an obstacle to the effective assimilation of data. In the operation of the typical signal analysis system, the background noise can at times mask intelligence-bearing signals, and thereby frustrate efforts to derive needed information.

A clear example of the conventional system for dealing with noise is found in underwater sound detecting systems. In both passive and active sound detecting systems, transducer apparatus is submerged in the water. Where the transducer is mounted on a ship or submarine, it is supported on a rotatable shaft extending through the hull. Where it is used at a shore station, the apparatus is customarily submerged in the water, and has a motor drive operable from a shore facility. Turning of the transducer is effected under manual control, as by turning the shaft on a ship, or by manipulating a rheostat which controls the motor drive.

The transducer, which has a diaphragm actuated in response to sound vibrations, generates voltages which are utilized to actuate the diaphragms of headphones. An operator wearing the headphones is on the alert for sounds which are perceptively different, in terms of time distribution and change in amplitude, than the background noise. The position of the transducer at which he receives the perceptible difference is interpreted by him as the bearing of a target.

Present underwater sound detecting systems are at a serious disadvantage because of their necessary reliance on the human element. For example, in the situation where the sounds arrive at the transducer from a single ship both directly and by reflection off another ship nearby, the operator may report the ship at both bearings. Alternatively, he may report the ship to be on the bearing along which the reflected sounds are received, and fail to detect the true bearing of the ship.

Another difficulty is the onset of auditory fatigue. The operator must constantly strain to hear against a distracting noise background. Further, movement of the target in the water, as in rolling and pitching of a ship, results in the sound therefrom traveling along different paths so as to appear to be varying in frequency and intensity. Auditory fatigue results after a period of attempting to pinpoint the bearing of a sound source under such circumstances and the operator is unable to determine the presence and bearing of underwater sounds. It is not at all uncommon at this point for an operator to report non-existent targets, and to fail to report targets which are present.

The so-called active system of sound detection is an attempt to remove some of the disadvantages inherent in the passive type system. In the active system, sounds generated by a target are not relied upon to detect its presence. Instead, a transmitter of tone signal pulses of a precise frequency is incorporated in the system. The operator listens for the signal pulses reflected by a target, to thereby detect the presence and bearing of the target.

To make the active system highly selective, it is designed to reject all but pulses of the predetermined frequency. Sonic noise of this frequency generated by the ship on which the transmitter and receiver are located often masks the reflected pulses, and the resulting low signal-to-noise ratio prevents detection of the target.

The effectiveness of both the active and the passive underwater sound detecting systems is limited by multiple-path propagation of sound waves. And as is well known, sound from a target travels along various paths therefrom, as by reflection from a nearby obstacle, and bouncing between the surface and the ocean bed and between layers of water which are at different temperatures. The net result is that the same frequencies arrive at the transducer in continuously varying phase relationships, thus causing the sound to be distorted and making detection impossible.

Thus, distortion limits the range of detection with underwater detecting systems. Furthermore, it occasionally obscures targets which are within the range capabilities of such systems.

It is a primary object of this invention to provide a unique passive type underwater detecting system with which targets far beyond the range of conventional systems can be detected.

Still another object of this invention is to provide an improved passive type underwater detecting system in which each of a number of targets on different bearings can be detected.

A further object of this invention is to provide a passive type underwater detecting system in which information about the bearing and presence of a target is provided without reliance upon a human operator.

It is yet another object of this invention to provide underwater detecting apparatus in which a transducer is continuously rotated so as to respond to variations in background noise along its acoustic axis, for the purpose of providing information about targets across which the acoustic axis is moved.

A further object of the present invention is to provide a novel method and apparatus for detecting and indicating the bearing of localized sound sources in the ocean wherein effects of a selected class of noise components on signal detection are reduced to provide improved detection of the sound sources.

Another object of the present invention is the provision of novel method and apparatus for detecting and indicating the bearing of sound signal sources in the ocean utilizing a reference derived in part from characteristics of noise other than energy to improve detection of the sound signal source.

Another object of the present invention is the provision of a novel method and apparatus for detecting and indicating the bearing of localized sound sources in the ocean wherein means are provided for taking advantage of non-Gaussian noise statistics and significant distorting properties of the ocean to provide improved detection and localization of the sound sources.

The above and other objects of this invention will become apparent from the following description, taken in conjunction with the accompanying drawings illustrating a preferred embodiment, in which:

FIGURE 5 is a graph illustrating waveforms at four points in the circuit of FIGURE 1 for each of three conditions.

Figure 1:
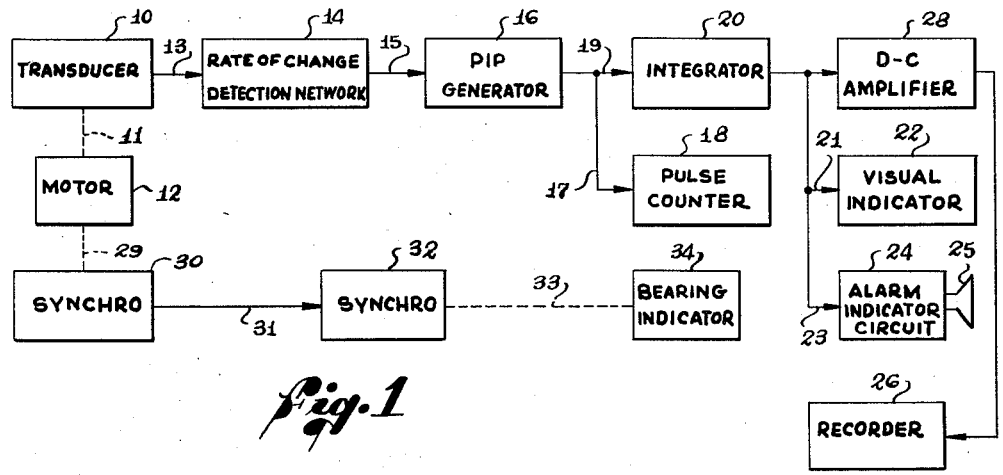
FIGURE 1 is a block diagram of an underwater detecting system operable in response to variations in undersea acoustic pressure statistics, as a function of bearing, to develop potential variations from which to detect the presence and bearing of a target in accordance with the present invention.

The present invention is a marked departure from conventional underwater sound detecting systems. Accordingly, and prior to describing the invention, it is felt that an explanation of certain fundamental principles will help to provide an understanding thereof.

Acoustic detection in the ocean is usually very unreliable, e.g. the range of a given sonar system may change by a factor of 100 or even more with changes in sound propagation conditions and/or noise energy level. Some of the factors which reduce the performance of conventional systems can be ignored or actually put to advantage in the invention to be described. In order that the operation of the invention can be understood, it will be necessary to describe the conditions which make acoustic detection in the ocean usually very difficult.

Scattering may be defined to be any effect which causes a sound ray to change direction. Examples are the surface and bottom of the ocean, variation of the velocity of sound with position and time (mostly the result of temperature changes), gas bubbles and solid particles in the volume of the ocean, and turbulent flow.

Absorption is that effect which causes conversion of sound energy into thermal energy. Absorption is frequency dependent being quite small at low sonic frequencies, but at ultrasonic frequencies so high that it is the dominant effect in limiting the range of detection.

Obviously of great importance are the noise generating mechanisms which tend to obscure the desired signal. Three components of noise will be defined:

Thermal noise is the result of agitation of the water molecules. Such noise has a Gaussian (normal) distribution of amplitudes and is sufficiently described by its energy spectrum which has a positive slope. Noise in the system amplifier is also Gaussian.

Water noise is generated primarily by motions of the sea surface. The spectrum of this noise has a negative slope and an amplitude dependent upon sea state.

Own-ship noise is particularly important when a receiving transducer is carried by a vessel under way. For frequencies above a few hundred cycles, such noise also has a negative slope.

Another important sound propagation effect in the ocean is frequency spreading, i.e., energy that is transmitted on a particular frequency is received over a band of frequencies which may be so wide that some of the energy transmitted in the sonic band may appear at the receiver in the ultrasonic band. One mechanism causing this effect is multiple scattering of a wave with moving scatterers. In this case, the length of a ray connecting source and receiver is a time-varying function, and the transmitted signal is modulated by a time-varying time delay. One could also say that the individual frequency components of the source wave are phase modulated. Another mechanism contributing to this effect can be called bubble modulation. Suppose a gas bubble in the water has its dimensions changed with time by a strong sound wave. Another wave passing the bubble is then subjected to a rapidly time-varying medium. The two waves are then cross-modulated and some of the energy may appear in the ultrasonic region. Frequency spreading permits ultrasonic energy to be received at long ranges from a sonic source because the spreading can take place gradually with range, or in the neighborhood of the receiver. Thus, the effective absorption is much lower than if the ultrasonic energy had traversed the entire path.

To continue the discussion, it is necessary to state the following theorems:

*Theorem* 1.—The response of any linear system to a Gaussian input is Gaussian.

*Theorem* 2.—If a source transmits to a receiver by a large number of independent time-varying paths, then that part of the received signal generated by the time-varying effects is approximately Gaussian.

*Theorem* 3.—A weak signal must be detected in Gaussian noise on an energy basis, i.e. the signal-to-noise energy ratio is sufficient to describe detectability.

*Theorem* 4.—If non-Gaussian noise is applied to a linear filter whose bandwidth is narrow compared to the bandwidth of the input noise, the output noise is approximately Gaussian.

Because sound energy is distributed over an area which increases as the range from the source increases, and because of absorption, the total energy (at all frequencies) available to a transducer decreases with range for sufficiently large range changes. This statement implies that noise generated near the receiving transducer contributes the greatest energy and that for any detector and source, there is some maximum range at which detection will be reliable. However, signal distortion is also a function of range and the distorted signal may be more detectable in the locally generated noise than if there were no distortion. Here is a favorable effect of increasing range which tends to counter the negative effect of propagation losses. This improvement is possible primarily because most local noise is non-Gaussian so that the signal need not compete with such noise strictly on an energy basis in the present invention. Thus, the signal-to-total noise ratio is not sufficient to define the performance of this detector. However, the signal-to-Gaussian noise ratio is important, where the Gaussian noise is the sum of thermal noise in the water, thermal and shot noise in the amplifier and transducer and (by theorem 2) noise sources at appreciable distance from the transducer which give rise to waves arriving on or near the acoustic axis of the directional transducer.

The high-frequency components of the non-Gaussian noise are the result of rapidly changing pressure in certain intervals of the pressure waveform. These intervals are usually spaced in time so that if the time constants of transducer and amplifier are sufficiently small (bandwidths large), the system will recover between the intervals. The high frequency content of the Gaussian noise and Gaussian signal is the result of rapid changes in a very large number of closely spaced intervals so that they are not resolvable. In order to take advantage of the non-Gaussian noise, it may be necessary to adjust the system to respond to a band of ultrasonic frequencies. If the range of the source is so large that ultrasonic energy radiated by the source is received at a level far less than Gaussian noise, then the system must depend upon sonic energy being spread into the ultrasonic band by propagation effects in the ocean. Since the optimum band of frequencies changes with time and the position of the transducer in the ocean, and because the properties of transducers are not usually adjustable, it is desirable that the transducers have response for all frequencies of anticipated use; the adjustments of system tuning are then made in the amplifier.

Conventional acoustic detection systems designed for long range operation do not recognize frequency spread energy, and thus receive energy in the sonic band to minimize the effects of absorption and small-scale scattering. Although water and own-ship noises have some non-Gaussian components, theorems 3 and 4 dictate that such systems must operate on the signal-to-total noise energy ratio. Thus, high sea states and high own-ship speed seriously limit the performance of conventional systems. However, these effects are less detrimental to the operation of this invention because of non-Gaussian properties of noise generated by them, and furthermore would be advantageous if they are important in providing frequency spreading of the signal. Another disadvantage of conventional systems is that a large receiving transducer is necessary to obtain directivity with which to determine the bearing of the long wavelength signals. Furthermore, many conventional systems are designed on the assumption of an ideal distortionless medium. For example, a receiver for an active sonar works at its best when the echo has a waveform closely matching the transmitted pulse, and most listening systems depend upon a human operator to recognize characteristic sounds radiated by the source. It is obvious that the signal distortion which is a result of scattering works to the disadvantage of these systems.

The above described principles are utilized by this invention to develop signals representing the background noise, and signals representing the mixture of target noise (direct or reflected) with the background noise. Using the signals representing background noise as a reference, an increase in output signals indicates the presence of a target in the background. This information is used to determine the bearing to the target. The output indication of the system on background noise alone may change appreciably with time if the transducer is stationary, or may be appreciably different on widely separated bearings. The transducer beam pattern and the signal pressure field in the water are such that relatively narrow indications of targets occur. Often these indications are observable on an output recording even when the noise input to the device is a function of bearing when the noise source angular extent is greater than that of the target indication. Furthermore when noise energy has short term variations as from wind gusts and the transducer is rotated at a rate such that the time occupied by a target indication is appreciably less than that of the gust, again the targets might be observable. In the absence of such disturbing effects the reference will be more stable thus facilitating adjustment and operation of the system and consequently reducing the probability of calling false targets and missing actual ones. How detection is accomplished will now be explained with reference to FIGURE 1.

Referring to FIGURE 1, a transducer 10, adapted to be submerged in the water, is mechanically connected at 11 to a constant speed motor 12. The electrical output of the transducer 10 is applied as at 13 to a rate of change detection network 14 for developing pulses which vary in number and amplitude in response to the voltage waveform at 13. Coupled at 15 to the detection network 14 is a pip generator 16 which responds to the pulses to develop unidirectional voltage pulses of fixed magnitude. A counter 18 coupled at 17 to the pip generator 16 is provided to give a direct indication of the changes in the rate at which the pulses occur.

Also coupled at 19 to the output of the pip generator 16 is an integrator 20 for developing a D.-C. output voltage which builds up to a value corresponding to the rate at which pulses appear in the output of the generator 16.

The D.-C. voltage from the integrator 20 is utilized to provide various indications of the presence of a target. A visual indicator 22 coupled at 21 to the integrator 20 provides information, as in the form of lamps which light when the output of the integrator 20 exceeds a certain level. An alarm indicator 24 is also coupled at 23 to the output of the integrator 20 and operates to provide an audible tone, as through a loudspeaker 25, signifying the presence of a target. Additionally, a recorder 26 is coupled to the output of the integrator 20 through a D.-C. amplifier 28, and operates in a conventional fashion to provide a permanent record of the voltage changes from the integrator 20.

The position of the transducer 10 is repeated so as to be presented at a convenient location. For this purpose, the motor 12 operates at 29 to actuate a transmitter synchro device 30, the electrical output of which is fed at 31 to a follower or receiver synchro device 32.

The resultant mechanical output 33 of the synchro 32 is utilized to rotate a bearing indicator card 34, so as to show the bearing of the target with respect to the transducer 10.

Figure 2:
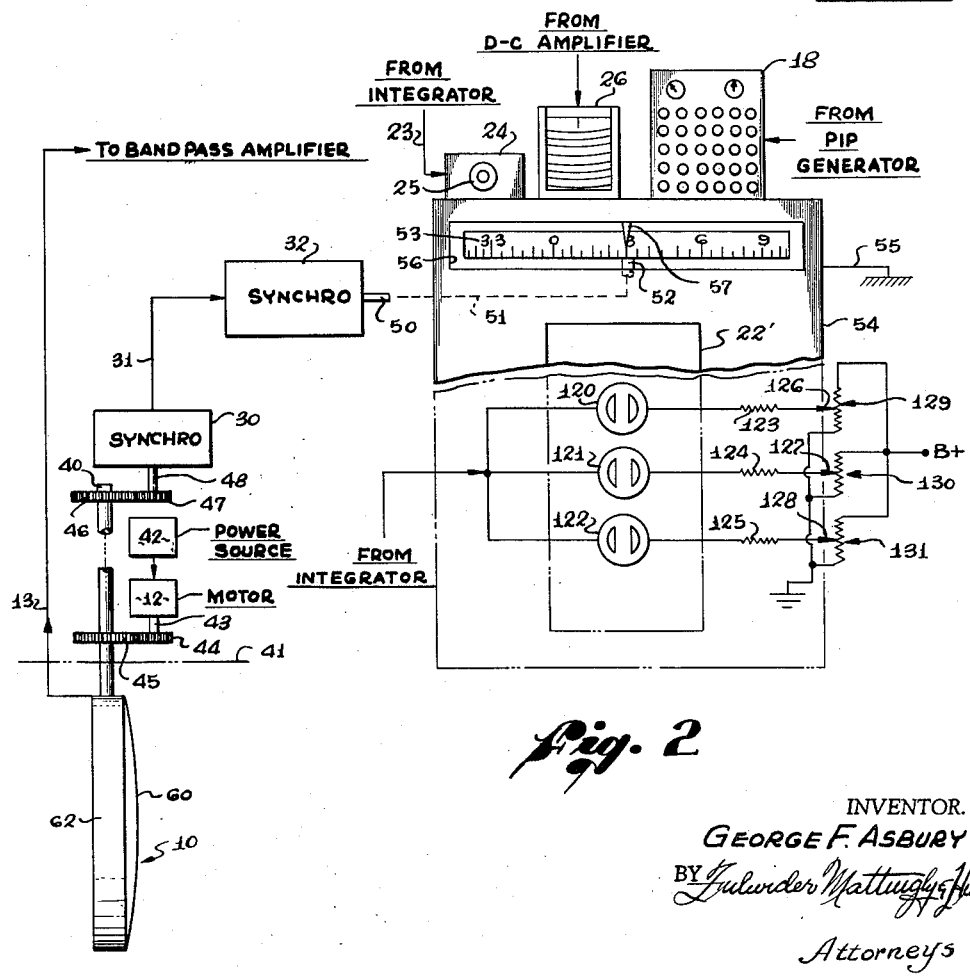
FIGURE 2 is a schematic diagram of the transducer of the system of FIGURE 1, together with display means to provide indications of the presence and bearing of a target.

Preferably, the various presentations are physically grouped together, as illustrated in FIGURE 2. Referring to FIGURE 2, the transducer 10 is mounted on the lower end of a shaft 40 which extends through a ship's hull, generally indicated at 41. The motor 12 is energized by a power source 42, and its output shaft 43 operates through a gear 44 thereon which meshes with a gear 45 on the shaft 40 to rotate such shaft 40 at a constant rate. The rate of rotation which is optimum may vary as from one revolution per minute or one revolution per second.

The shaft 40 is also provided with another gear 46 which meshes with a gear 47 on the rotor shaft 48 of the transmitter synchro 30. The rotor shaft 50 of the receiver synchro 32 is adapted, as indicated at 51, to rotate the central shaft 52 of a cup-shaped element 53 which has bearing markings inscribed on the skirt thereof. The element 53 is rotatably mounted within a housing 54 which is fixed within the ship as indicated at 55.

The markings on the element 53 are visible through a window 56 provided in the housing 54. A fixed index element 57 supported by the housing is disposed intermediate the ends of the window 56, with the pointed end thereof disposed between the upper and lower sides of the window. The end of the index 57 represents a desired reference, such as true north, and the bearing marking which appears thereunder represents the angle at which the diaphragm of the transducer 10 is pointed with respect to the reference.

Mounted on the housings 54 are the alarm indicator 24 (and its speaker 25), the pulse counter 18, and the chart recorder 26. The front panel of the housing contains the visual indicator 22, which has lights, to be described hereinafter, for visually indicating the presence of a target. By such grouping, all information concerning the presence and bearing of a target is presented at a central location.

The diaphragm of the transducer 10 is indicated at 60 in FIGURE 2. As previously indicated, pressure on the transducer elements transmitted through the diaphragm 60 causes voltages to be generated, which are fed, as at 13, to a band-pass amplifier which, as will be explained more fully hereinafter, forms part of the rate-of-change detection network 14 of FIGURE 1.

Figure 3:
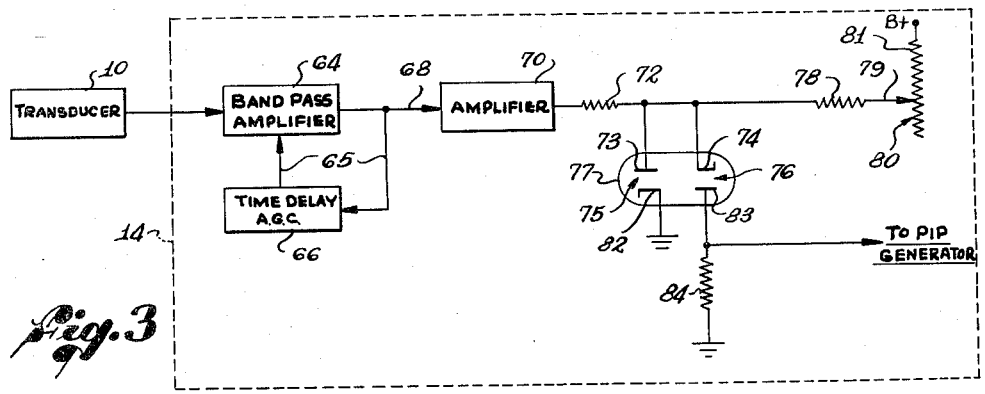
FIGURE 3 is a combined block and schematic diagram of the potential change detection network of FIGURE 1, to illustrate how the potential variations are processed.
Figure 4:
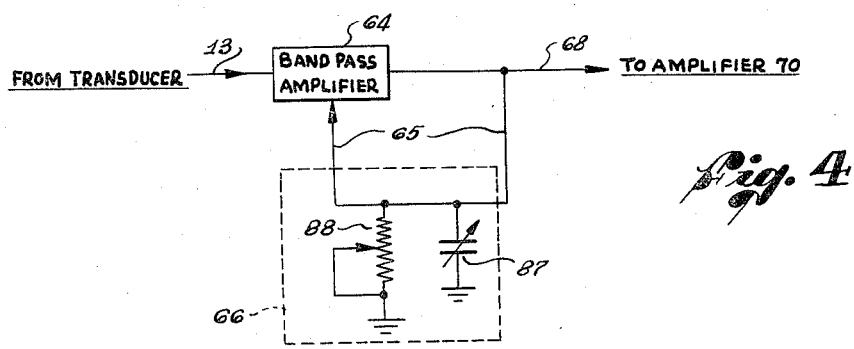
FIGURE 4 is a schematic diagram of an illustrative circuit for the time delay network of FIGURE 3.

Circuits used in the detection network 14 of FIGURE 1 are illustrated in FIGURE 3. The output of the transducer 10 is applied at 13, as heretofore mentioned, to an amplifier 64. The amplifier preferably is of the band-pass type, and is adapted to pass signals within a range of the frequencies of the pressure variations in the water. For example, the receiver may be tunable from 8 kc. to 50 kc.; the pass band ratio may range from 5:1 to 100:1. The optimum settings for the amplifier are a function of non-Gaussian noise statistics and the frequency spectrum of the received signal.

The amplifier is provided with a negative feedback loop 65 in which a time delay AGC (automatic gain control) network 66 is located. The AGC network 66 provides a gain setting for the amplifier 64, and is operative in a normal manner to reduce the gain in the presence of input voltages above a predetermined level; the selection of this predetermined level will be made more evident hereinafter. However, since the AGC network 66 contains time delay means (such means being conventional in the art), any sudden (transient) changes in input voltages above the predetermined level will pass through the amplifier 64 without reduction in gain.

The delay period may be as desired, e.g., of the order of 0.01 second. At the end of the delay period, the normal AGC function is carried out, i.e., the gain of the amplifier 64 will be reduced if any input voltages in the transient still remain. If the amplifier output envelope tends to stay at a high level for a long time as a result of a single large noise burst or a closely spaced series of bursts, the AGC will act to counter this effect. Thus, the AGC not only operates to stabilize the amplifier output for large changes in input energy as is done in radio receivers, but also tends to reduce the effects of non-Gaussian noise.

In the operation of the amplifier 64, the time delay in the AGC network 66 is arranged, in accordance with this invention, to insure that the gain of the amplifier 64 increases much more rapidly, upon a decrease in input, than it can be decreased upon an increase in input. To this end, and referring to FIGURE 6, a capacitor 69 and resistor 71 in parallel are made variable. The adjustment in either or both of these components is made as necessary to insure this result. The resistor 71 forms a quick discharge path for a charge on the capacitor 69, when the input to the amplifier 64 decreases, any charge on the capacitor 69 quickly leaks off, thereby to cause the gain of the amplifier 64 to be rapidly increased, e.g., in .005 second.

The output of the amplifier 64 is applied, as at 68, to an amplifier 70 for amplification to a desired level. The output of the amplifier 70 is connected through a resistor 72 to the anode 73 and the cathode 74 of respective unidirectional conductive devices, shown as diodes 75 and 76 enclosed in a single envelope 77, which are used for developing pulses. The anode 73 and the cathode 74 are connected through a resistor 78 to the sliding contact 79 of a variable resistance device 80. The resistor 81 of the device 80 is connected to a point of fixed voltage potential, e.g., the positive terminal B of a D.-C. supply source. The cathode 82 of the diode 75 is connected to a point of reference or ground potential.

The setting of the sliding contact 79 is such that in the absence of signals from the output of the amplifier 70, the anode 73 of the diode 75 is slightly positive, thereby to cause the diode 75 to conduct, i.e., to by-pass the positive half of the output of the amplifier 70 to ground.

When signals appear in the output of the amplifier 70, their negative portions cause the voltage of the anode 73 of the diode 75 to be lowered, thereby cutting off the diode 75. Simultaneously, the diode 76 is rendered conducting.

The anode 83 of the diode 76 is connected through a load resistor 84 to ground, and to the input of the pip generator. When the diode 76 conducts, a pulse appears on the anode 83 having a peak magnitude which is a function of the peak magnitude of the corresponding negative half-cycle from amplifier 70.

Referring to the graphs of waveforms illustrated in FIGURE 5, the waveform 87 illustrates the envelope of the output from bandpass amplifier 64 for a purely non-Gaussian noise input, the waveform 88 illustrates the envelope of the output from amplifier 64, in response to the total noise input comprising both Gaussian noise and non-Gaussian noise, and the waveworm 89 illustrates the envelope of output from the amplifier 64 in response to total noise plus signal. The bandpass amplifier 64 is adjusted such that its response to the non-Gaussian noise is a series of disjoint bursts 90, 91 and 92. This requires a selection of central frequency and bandwidth. When the bandpass is properly tuned, most of the non-Gaussian bursts 90, 91 and 92 are resolved, which is to say that the circuit is not time saturated and is allowed to recover between input excitations. The Gaussian components of noise are then observable between the bursts 90, 91 and 92. This is indicated in the waveform 88, wherein the crests or lobes 90′, 91′ and 92′ correspond respectively to the bursts 90, 91 and 92 in waveform 87, and the response of the bandpass amplifier 64 to the Gaussian components of background noise are indicated by reference characters 93 and 94. The waveforms 95, 96 and 97 depict the output of the detector network 14, specifically as derived from the top of the load resistor 84 coupled to the anode 83 of diode 76, for the non-Gaussian noise, total noise and total noise plus signal conditions respectively denoted by waveforms 87, 88 and 89.

The outputs from the detector network 14 are in the form of negative going pulses 97, the magnitudes of the pulses corresponding to the magnitudes of the cycles within the output envelopes of the bandpass amplifier 64. For example, for the non-Gaussian noise condition, the negative going pulses 97 of the waveform 95 are related roughly in magnitude to the cycles making up the bursts 90, 91 and 92 in the waveform 87, and for the total noise condition depicted by waveform 96, smaller amplitude pulses 97 occur between the pulses corresponding to the non-Gaussian bursts in response to the cycles of the envelope portions 93 and 94 of waveform 88. The pip generator 16 forms pulses of constant height 98 in response to the pulses 97 at the output of the detector network 14, the output of the pip generator 16 being depicted by the waveforms 99, 100 and 101 for the non-Gaussian noise, total noise and total noise plus signal conditions, respectively. A threshold is provided for the pip generator 16 which the pulses 97 must exceed for pip generator output pulses 98 to be produced, this threshold being indicated by the broken line 102 in the waveforms 95, 96 and 97. The pip generator threshold 102 is set such that relatively few of the cycles of Gaussian noise result in pip generator output pulses 98. Thus, the pip generator 16 forms a pulse 98 of constant height for each cycle of amplifier 64 which is large enough to cause the output from the diode 76 to exceed the threshold 102. As long as the threshold 102 is exceeded by the pulses 97, a large amplitude cycle in a non-Gaussian burst 90, 91 or 92 has the same weight in the output of pip generator 16 as a smaller cycle due to Gaussian components of the noise.

The D.C. output voltages developed by the integrator 20 from the pulses 98 produced at the output of the pip generator 16 for the non-Gaussian noise, total noise and total noise plus signal conditions are illustrated at 103, 104 and 105. The integrator output voltage levels correspond in magnitude to the number of pulses 98 generated in a unit of time, so that the output of the integrator 20 is in effect a measure of the pulse density.

It should now be apparent how the present invention is able to detect weak signals in strong non-Gaussian noise. When the transducer 10 is trained across the bearing of a target whose spectrum contains sufficient energy within the pass band of the amplifier 64 to be comparable with the Gaussian noise energy in the same band, some of the cycles of the output of amplifier 64 will increase in amplitude sufficient to cause the density of the pulses 98 produced by the pip generator to increase. This will be apparent from consideration of waveforms 89, 97, 101 and 105. The increase in amplitude of the envelope 89 in the zones 93′ and 94′ corresponding to the regions 93 and 94 of waveforms 88 between the non-Gaussian noise lobes occurs as a result of components of target signal energy whose frequency falls within the pass band of amplifier 64 which adds to the Gaussian noise energy lying within the same band and produces cycles having sufficient amplitudes to cause generation of pulses 98 at the output of the pip generator 16 when the Gaussian noise energy alone in that band will not have produced corresponding pulses 98. It is important that the non-Gaussian bursts in the response of the bandpass amplifier 64 to input excitation be resolved to provide gaps or holes through which Gaussian components may then be observed between the bursts. If the bandpass is improperly adjusted its output will be ringing as a result of previous non-Gaussian excitation at the time of new excitation. In such a case almost every cycle of the output of the bandpass amplifier 64 will be large enough to exceed the pip generator threshold and the additional contribution of a weak signal cannot then be observed.

One form of the visual indicator 22 to provide a visual alarm signifying the presence of a target is illustrated in FIGURE 2 as shown, the output of the integrator is connected to respective electrodes of three neon tubes 120, 121 and 122. The remaining electrodes of these tubes are connected through respective resistors 123, 124 and 125 to the sliding contacts 126, 127 and 128 of respective potentiometers 129, 130 and 131, each of which is connected between the positive terminal B+ of a D.C. voltage source and ground.

The sliding contact 128 of the potentiometer 131 is set to permit the neon tube 122 to fire when the voltage from the integrator is at a level corresponding to the reference rate of pulses applied to the integrator 20. Accordingly, the neon tube 122 constitutes a check means for ascertaining that the system is in working condition.

The sliding contact 127 of the potentiometer 130 preferably is set so that the neon tube 121 fires when the voltage from the integrator rises only slightly above that necessary to cause the neon tube 122 to fire. The firing of the neon tube 121 is indicative of the approach of the acoustic axis of the transducer to a bearing on which a target is located.

The sliding contact 126 of the potentiometer 129 is set so that the neon tube 120 will fire when the voltage from the integrator represents a marked increase in the rate at which pulses from the pip generator 16 occur. This increase will be at a point where the acoustic axis of the transducer 10 is on the bearing of the source of sonic energy which occasioned the increase.

The alarm indicator circuit 24 is a conventional circuit for actuating a loud speaker in response to varying input voltages. Preferably, the circuit 24 operates at the same voltage necessary to cause the neon tube 120 of the visual indicator circuit 22 to fire, so as to provide simultaneously therewith an audible tone to give warning of the presence of a target.

The alarm indicator circuit 24 and the loudspeaker 25 may be a conventional clapper-type bell structure commonly employed in burglar alarms systems. In such case, upon the occurrence of the voltage necessary to cause the neon tube 120 to fire, the bell would also be actuated to warn the operator of the presence of the target.

The audible alarm circuit 24 is particularly useful when the apparatus is untended. Where there is no observer in the vicinity of the apparatus, tones from the loudspeaker 25 will warn those within earshot of the presence of a target, and thereby alert them to check the bearing indicator 34 to determine the bearing of the target. To further aid in sounding the alert, multiple alarm circuit units may be employed at various locations throughout a ship.

It has previously been mentioned that the sounds reaching the transducer along a bearing may come from a target which generates or reflects sounds. The acoustic axis of the transducer may sweep past a "dead" target, i.e., one which is not generating sounds. However, this target may reflect sounds propagated toward it from other targets which are generating sounds. To the transducer, the "dead" target appears as a source of sonic energy and the system of this invention will detect its presence.

Although this invention has been described in connection with detecting objects under water, it will be recognized that it is useful in analyzing signals developed in other media. The transducer may be an antenna, in which case the system would be adapted, for example, to detect the presence of a source of interference. The transducer may be an optical transducer, such as a "light-chopper," image orthicon or the like, thus adapting the system to indicate a hitherto undetectable light-emitting object in an ambient light background.

While I have illustrated one embodiment of means to produce the desired results, various modifications will be apparent those skilled in the art which fall within the spirit and scope of my invention. Therefore, I do not intend that my invention be limited except as defined by the appended claims.

I claim:

1. The method of detecting localized sound signal sources in an energy propagating medium having background noise therein including Gaussian and non-Gaussian components of noise comprising the steps of sensing the occurrences of selected high rate-of-change of those properties in the medium to which an electro-acoustic transducer responds to provide an output voltage which vary as a function of background noise and sound source generated signals in the medium, developing indications representing the density of occurrence of said selected high rate-of-change of said properties, detecting the density of said selected high rate-of-change attributable predominantly to non-Gaussian components of the background noise, sensing increases in density of said selected high rate-of-change relative to the density attributable to non-Gaussian noise components, and producing an output indication upon occurence of such density increases.

2. The method of detecting and determining the bearings of localized sound signal sources in the ocean under conditions wherein background noise occurs in the ocean including Gaussian and non-Gaussian components of noise comprising the steps of sensing along selected azimuth bearings properties of acoustic waves propagated through the aceon which vary as a function of background noise and signals generated by the sound sources and producing voltage waveforms having selected high rate-of-change waveform segments responsive to said properties, developing indications representing the density of occurrence of said waveform segments, detecting the density of said selected waveform segments which are attributable predominantly to non-Gaussian components of the background noise, continuously shifting the azimuth bearing along which said energy is sensed, sensing increases of density of said selected waveform segments relative to the density attributable to non-Gaussian noise components with changes in the azimuth direction along which the energy is sensed, and producing bearing-referenced output indications upon occurrence of such density increases.

3. The method of detecting and determining the bearing of localized sound signal sources in the ocean wherein background noise occurs including Gaussian and non-Gaussian components of noise comprising the steps of submerging in the ocean, an electro-acoustic transducer having an acoustic axis for generating output voltage waveforms responsive to signals generated by said sources and background noise in the ocean, rotating said transducer in the ocean to cause its acoustic axis to sweep past a plurality of bearings relative to the location of the transducer, sensing the occurrences of selected high rate-of-change waveform segments in the transducer output waveform representing signals in a selected frequency band and components of background noise, generating pulses denoting occurrences of said waveform segments in said transducer output waveform, sensing the density of said pulses, developing referenced densities of said pulses representing densities thereof attributable predominantly to non-Gaussian components of the background noise, sensing increases in the densities of said pulses relative to said referenced densities as the transducer is trained in bearing, and producing bearing-referenced output indications upon occurrence of such density increases.

4. A system for detecting signals propagated through an energy propagating medium from a localized sound signal source in the medium, comprising a transducer for producing an output responsive to properties of acoustic waves propagated through the medium which vary as a function of background noise and signals generated by the sound source, detector means responsive to occurrences of selected high rate-of-change waveform segments in the transducer output representing signals in a selected frequency band propagated through the medium and components of background noise for producing detector outputs denoting occurrence of said waveform segments, means for sensing the density of said detector outputs, and means responsive to densities of said detector outputs greater than densities attributable predominantly to non-Gaussian components of the background noise for producing distinctive output indications of the occurrence of the greater densities.

5. A system for detecting localized sound sources in the ocean, comprising an electro-acoustic transducer to be located in the ocean for producing an output responsive to signals and background noise in the ocean, detector means responsive to occurrences of selected high rate-of-change waveform segments in the transducer output representing signals in a selected frequency band propagated through the ocean from the sound sources and components of background noise for producing detector outputs denoting occurrence of said waveform segments, means for sensing the density of said detector outputs, and means responsive to densities of said detector outputs greater than densities resulting predominantly from non-Gaussian components of the background noise for producing distinctive output indications of the occurrence of the greater densities.

6. A system for detecting localized sound sources in the ocean wherein background noise occurs including Gaussian and non-Gaussian noise components, comprising an electro-acoustic transducer for producing an output responsive to signals and background noise in the ocean, detector means responsive to occurrences of selected high rate-of-change waveform segments in the transducer output representing signals in a selected frequency band propagated through the ocean from the sources and components of background noise for producing detector outputs denoting occurrence of said waveform segments, means for sensing the density of said detector outputs, means for developing reference densities of said detector outputs attributable substantially solely to non-Gaussian components of the background noise, means responsive to densities of said detector outputs greater than said reference densities for producing distinctive output indications of the occurrence of said greater densities.

7. A system for detecting localized sound signal sources in the ocean wherein background noise occurs including Gaussian and non-Gaussian noise components, comprising an electro-acoustic transducer for producing an output responsive to signals and background noise in the ocean, detector means responsive to a selected high rate of change waveform segment in the transducer output representing signals in a selected frequency band propagated from the sources and components of background noise for producing detector output pulses denoting occurrences of said waveform segments, threshold means responsive to said detector pulses having an amplitude threshold greater than the amplitudes of substantially all detector pulses denoting said selected waveform segments in Gaussian components of the background noise for producing constant amplitude pulses for detector pulses which exceed said threshold, means for sensing the density of said constant amplitude pulses, and means responsive to changes in the density of said constant amplitude pulses for producing sensible output indications of increases in the density of said constant amplitude pulses above a selected level.

8. A system for detecting and determining the bearing of localized sound signal sources in the ocean wherein background noise occurs including Gaussian and non-Gaussian noise components, comprising an electro-acoustic transducer having an acoustic axis for producing an output responsive to signals and background noise in the ocean, means for rotating said transducer in the ocean to cause said acoustic axis to sweep past a plurality of bearings relative to the location of the transducer, means operative synchronously with the transducer to provide a visual indication of the bearing of the acoustic axis, detector means responsive to a selected high rate of change waveform segments in the transducer output representing signals in a selected frequency band propagated from the sources and components of background noise for producing detector output pulses denoting occurrences of said waveform segments, threshold means responsive to said detector pulses having an amplitude threshold greater than the amplitudes of substantially all detector pulses denoting said selected waveform segments in Gaussian components of the background noise for producing constant amplitude pulses for detector pulses which exceed said threshold, means for sensing the density of said constant amplitude pulses, and means responsive to changes in the density of said constant amplitude pulses as said transducer is rotated for producing sensible bearing-referenced output indications of increases in the density of said constant amplitude pulses above a selected level of density.

9. A system for detecting and determining the bearing of localized sound signal sources in the ocean wherein background noise occurs including Gaussian and non-Gaussian noise components, comprising an electro-acoustic transducer having an acoustic axis for producing an output responsive to signals and background noise in the ocean, means for rotating said transducer in the ocean to cause said acoustic axis to sweep past a plurality of bearings relative to the location of the transducer, means operative synchronously with the transducer to provide a visual indication of the bearing of the acoustic axis, detector means responsive to a selected high rate-of-change waveform segments in the transducer output representing signals in a selected frequency band propagated from the sources and components of background noise for producing detector output pulses denoting occurrences of said waveform segments, threshold means responsive to said detector pulses having an amplitude threshold greater than the amplitudes of substantially all detector pulses denoting said selected waveform segments in Gaussian components of the background noise for producing constant amplitude pulses for detector pulses which exceed said threshold, integrator means for producing D.C. control voltages representative of the densities of said constant amplitude pulses, means responsive to increases in said D.C. control voltages as said transducer is rotated for producing sensible bearing-referenced output indications of increases in the density of said constant amplitude pulses above a selected level.

10. A system for detecting localized sound signal sources in the ocean wherein background noise occurs including Gaussian and non-Gaussian noise components, comprising an electro-acoustic transducer for producing an output responsive to signals produced by said sound signal sources and background noise in the ocean, detector means including bandpass amplifier means responsive to selected high rate-of-change waveform segments in the transducer output representing signals in a selected frequency band propagated from the sources and components of background noise for producing output cycles denoting occurrences of said waveform segments, said bandpass amplifier means being responsive to non-Gaussian input excitation for producing output bursts of said cycles and resolving the bursts between input excitations, means for producing detector pulses responsive to said output cycles of said detector means, pulse generating means having an amplitude threshold for producing uniform amplitude pulses responsive to detector pulses whose amplitudes exceed the threshold to render the density of the uniform pulses representative substantially only of occurrences of the selected waveform segments in non-Gaussian noise when no signal is represented in the transducer output, means for sensing changes in the density of said uniform amplitude pulses with change in transducer bearing and producing sensible output indication of increases in the densities of the uniform amplitude pulses above the density thereof representative of said selected waveform segments in non-Gaussian noise.

11. A system for detecting localized sound signal sources in the ocean wherein background noise occurs including Gaussian and non-Gaussian noise components, comprising an electro-actoustic transducer for producing an output responsive to signals produced by said sound signal sources and background noise in the ocean, detector means including bandpass amplifier means responsive to selected high rate-of-change waveform segments in the transducer output representing signals in a selected frequency band propagated from the sources and components of background noise for producing output cycles denoting occurrences of said waveform segments, said bandpass amplifier means being responsive to non-Gaussian input excitation for producing output bursts of said cycles and resolving the bursts between input excitations, means for producing detector pulses responsive to said output cycles of said detector means, pulse generating means having an amplitude threshold for producing uniform amplitude pulses responsive to detector pulses whose amplitudes exceed the threshold to render the density of the uniform pulses representative substantially only of occurrences of the selected waveform segments in non-Gaussian noise when no signal is represented in the transducer output, said transducer having an acoustic axis, means for rotating said transducer to cause its acoutic axis to sweep past a plurality of bearings, means for sensing changes in the density of said uniform amplitude pulses with change in transducer bearing and producing sensible bearing-referenced output indication of increases in the densities of the uniform amplitude pulses above the density thereof representative of said selected waveform segments in non-Gaussian noise.

References Cited in the file of this patent
UNITED STATES PATENTS

| | | |
|---|---|---|
| 1,892,646 | Wolff | Dec. 27, 1932 |
| 2,166,991 | Guanella | July 25, 1939 |
| 2,411,494 | Bliss | Nov. 19, 1946 |
| 2,417,310 | Luck | Mar. 11, 1947 |
| 2,566,858 | Sebring | Sept. 4, 1951 |
| 2,590,460 | Rackey et al. | Mar. 25, 1952 |
| 2,641,693 | Labin et al. | June 9, 1953 |
| 2,776,396 | Gille | Jan. 1, 1957 |
| 2,780,795 | Ambrosio | Feb. 5, 1957 |
| 2,782,412 | Brockner | Feb. 19, 1957 |
| 2,800,583 | Gerks | July 23, 1957 |
| 2,884,085 | Von Wittern et al. | Apr. 28, 1959 |
| 2,907,012 | Pitman et al. | Sep. 29, 1959 |
| 2,994,826 | Wagner | Aug. 1, 1961 |